(12) United States Patent
Collina et al.

(10) Patent No.: US 6,180,720 B1
(45) Date of Patent: Jan. 30, 2001

(54) POLYOLEFIN MIXTURE CONTAINING POLY(1-BUTENE)

(75) Inventors: Gianni Collina, Loc. Cassana; Anteo Pelliconi, Santa Maria Maddalena, both of (IT)

(73) Assignee: Montell North America Inc., Wilmington, DE (US)

(*) Notice: Under 35 U.S.C. 154(b), the term of this patent shall be extended for 0 days.

(21) Appl. No.: 09/230,682

(22) PCT Filed: May 22, 1998

(86) PCT No.: PCT/EP98/03029

§ 371 Date: Jan. 28, 1999

§ 102(e) Date: Jan. 28, 1999

(87) PCT Pub. No.: WO98/54251

PCT Pub. Date: Dec. 3, 1998

(30) Foreign Application Priority Data

May 29, 1997 (IT) .............................................. MI97A1258

(51) Int. Cl.⁷ ................................ C08F 8/00; C08L 23/00

(52) U.S. Cl. ............................................. 525/191; 525/240
(58) Field of Search ....................................... 525/191, 240

(56) References Cited

U.S. PATENT DOCUMENTS

| 4,078,020 | 3/1978 | Rose et al. . |
| 5,143,978 | * 9/1992 | Berta ..................................... 525/240 |
| 5,286,564 | 2/1994 | Cecchin et al. . |
| 5,552,482 | * 9/1996 | Berta ..................................... 525/88 |

FOREIGN PATENT DOCUMENTS 0 472 956 B1   3/1992   (EP) .

* cited by examiner

*Primary Examiner*—Nathan M. Nutter

(57) ABSTRACT

Thermoplastic and elastomeric polyolefin mixture including from 3 to 25% by weight of crystalline or partially crystalline isotactic poly(1-butene), and from 75 to 97% by weight of a heterophasic polyolefin composition; the latter containing a crystalline propylene polymer and an elastomeric copolymer of ethylene with propylene and/or an α-olefin.

5 Claims, 5 Drawing Sheets

POLYOLEFIN MIXTURE CONTAINING POLY(1-BUTENE)

This application is a U.S. National Stage application of International application PCT/EP98/03029, filed May 28, 1998.

This invention concerns an elastomeric and thermoplastic polyolefin mixture. More particularly, it concerns a mixture comprising a heterophasic polyolefin composition and some crystalline or partially crystalline poly(1-butene), and the articles produced with said mixture.

The mixture of this invention can be used in many sectors, for example in the production of laminates, roofing materials, and articles manufactured by way of coinjection and injection molding, as well as blow molding, such as biomedical articles.

At the present time the main disadvantage of the heterophasic compositions with good flexibility and softness characteristics that are used in the above mentioned sectors, such as the ones described in published European patent application EP-A-472946 (Himont Inc.), is the tendency of being tacky. Said property is undesirable for some applications, for example, because it has a negative effect on the aesthetic aspect of the article, and does not ensure a good welding seal due to the presence of low molecular weights that rise to the surface of the sides to be welded. Moreover, highly tacky materials make storing difficult and the use of laminates more troublesome.

Also known are heterophasic compositions comprising crystalline poly(1-butene), crystalline propylene, and EPR or EPDM rubber. Examples of said mixtures are described in U.S. Pat. No. 4,078,020 in the name of Ciba Geigy Corporation. Said compositions present good flexibility and low hardness values.

Now a mixture of the above mentioned composition has been found which is very flexible, and displays very low hardness as well as low tackiness values.

In addition, the above mentioned mixture presents good tensile strength. As shown by the stress-strain curve, the specimen prepared with the above mentioned mixture shows greater strain resistance compared to the mixture without poly(1-butene). Said improvement does not have an adverse effect on other properties, particularly on flexibility. Therefore, the balance of the other mechanical properties is not significantly different from that of the mixture without poly(1-butene).

Considering said properties, the mixture of this invention is specifically adequate for use in the production of geomembranes, for example. In fact, among the properties that are most desirable for geomembranes are good flexibility and good strain resistance. Flexibility is important because it makes it easier to handle the membranes during their transport and laying, and because the membranes can conform as much as possible to the undulations and roughness of the ground.

Moreover, as mentioned above, said mixtures also present the additional advantage of having reduced and delayed surface tackiness. The gradual increase in surface tackiness of an arcicle manufactured from elastomeric polymers is an undesired phenomenon that inevitably manifests itself after a period of time. The mixtures of the present invention, on the other hand, allow the manufacture of articles with satisfactory optical properties, such as gloss for example, as well as articles with strong welds. Moreover, low tackiness, for example, avoids the difficulties related with the storage and use of the laminates.

Therefore, object of the present invention is a thermoplastic and elastomeric polyolefin mixture comprising the following fractions (weight percentage):

I. from 3 to 25%, preferably 5–20%, of crystalline or partially crystalline isotactic poly(1-butene); and II. from 75 to 97%, preferably from 80 to 95%, of a heterophasic polyolefin composition comprising:

A. 4–40%, preferably 8–38%, of a crystalline propylene homopolymer, or a crystalline copolymer of propylene with ethylene or a $CH_2=CHR$ α-olefin, where R is a $C_2$–$C_8$ alkyl radical, or a crystalline copolymer of propylene with ethylene and said $CH_2=CHR$ α-olefin, said copolymers containing over 85% of propylene, and having a fraction insoluble in xylene greater than 80%;

B. 0–20%, preferably 0–15%, of a crystalline copolymer of ethylene with propylene or a $CH_2=CHR$ α-olefin, where R is a $C_2$–$C_8$ alkyl radical, or a crystalline copolymer of ethylene with propylene and said α-olefin, said copolymers being insoluble in xylene at ambient temperature; and C. 40–96%, preferably 50–75%, of an elastomeric copolymer of ethylene with propylene or a $CH_2=CHR$ α-olefin, where R is a $C_2$–$C_8$ alkyl radical, and optionally minor quantities of a diene, or a copolymer of ethylene with propylene and said α-olefin, and optionally minor quantities of a diene, said copolymers containing ethylene in a quantity lower than 40%, preferably from 20 to 38%, and being soluble in xylene at ambient temperature.

Figure 1:
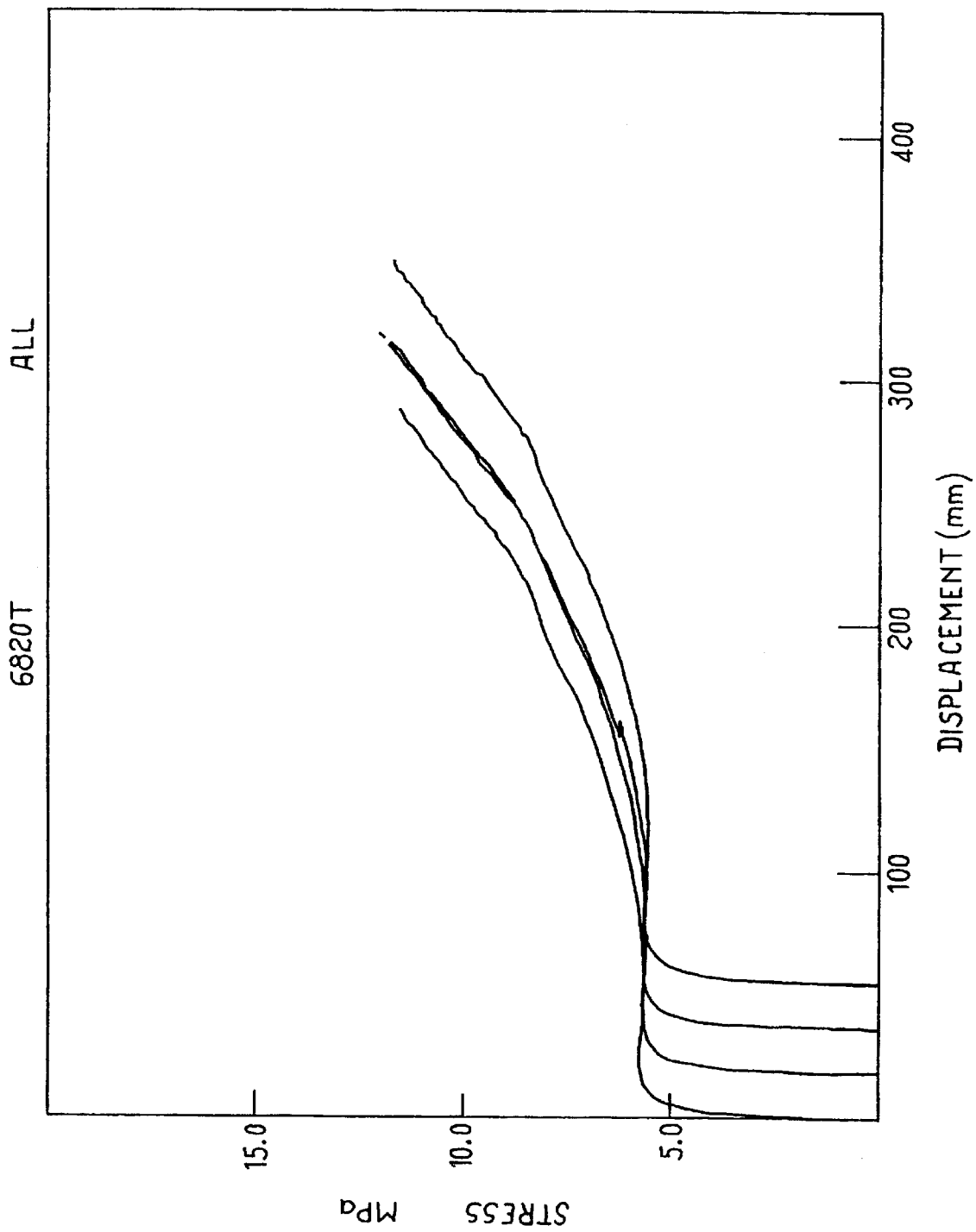
FIG. 1 depicts a stress/strain curve of specimens produced according to Example 1.

In the present description ambient temperature refers to a temperature around 25° C. As a way of example, the total quantity of ethylene in heterophasic composition (II) ranges from 15 to 35% by weight.

Examples of heterophasic compositions (II) are described in the above mentioned European patent application U.S. Pat. No. 5,286,564, whose content is incorporated in this patent application for reference purposes.

In the mixture of the present invention it is preferable that fraction (A) of heterophasic composition (II) be a copolymer instead of a homopolymer. Preferably the propylene content in the copolymers of fraction (A) ranges from 90 to 99% by weight.

The fraction insoluble in xylene of the polymers of fraction (A) preferably ranges from 85 to 99% in the case of homopolymers, and from 85 to 95% in the case of copolymers, and is defined as fraction insoluble in xylene at 25° C. (see note 1 below).

Preferably the content of ethylene in fraction (B) is at least 75% by weight, more preferably at least 80% by weight with respect to the total weight of (B). Preferably the copolymer constituting fraction (B) is an essentially linear copolymer of ethylene with propylene, such as linear low density polyethylene (LLDPE).

Examples of the above mentioned $CH_2=CHR$ α-olefins present in heterophasic composition (II) are 1-butene, 1-pentene, 4-methyl-1-pentene, 1-hexene, and 1-octene. Whenever present, the diene in fraction (C) of composition (II) preferably ranges from 1 to 10% by weight with respect to the total weight of fraction (C). Examples of dienes are butadiene, 1,4-hexadiene, 1,5-hexadiene, and ethylidene-1-norbornene.

The above mentioned heterophasic composition (II) can be prepared by mixing fractions (A), (B), and (C) in the fluid state, i.e., at temperatures greater than their softening or melting point, or, more preferably, by sequential polymerization in two or more stages in the presence of a highly stereospecific Ziegler-Natta catalyst. In particular the catalyst system used comprises (i) a solid catalytic component containing a titanium compound and an electron-donor compound supported on magnesium chloride, and (ii) an Al-trialkyl compound and an electron-donor compound.

The above mentioned sequential polymerization process for the production of heterophasic composition (II) comprises at least two stages, where in the first stage the propylene is polymerized optionally in the presence of ethylene and/or said α-olefin as comonomer(s) to form fraction (A), and in the subsequent stages the mixtures of ethylene/propylene and/or an other α-olefin and optionally a diene are polymerized to form fractions (B) and (C). The polymerization processes are carried out in either liquid, gas, or liquid/gas phase. The reaction temperature in the various stages of polymerization can be equal or different, and generally ranges from 40° to 90° C., preferably from 50 to 80° C. for fraction (A), and from 40 to 60° C. for fractions (B) and (C).

Examples of sequential polymerization processes are described in European patent application EP-A472946. When heterophasic composition (II) is prepared by way of sequential polymerization, fraction (B) is present in a quantity greater than or equal to 1% by weight. If said fraction (B) is present, it is preferable that the (B)/(C) weight ratio be lower than 0.4, in particular from 0.08 to 0.3. It is also preferable that the weight percentage of fraction (C), or the sum of fractions (B) and (C) be from 50 to 90%, preferably from 60 to 80%, with respect to heterophasic composition (II).

The Melt Index (MI) values (according to ASTM D 1238, condition L) of heterophasic composition (II) generally range from 0.1 to 100 g/10 min, preferably from 0.2 to 50 g/10 min. The heterophasic composition (II) with said MI values can be obtained directly during the polymerization process; as an alternative, said composition (II) can be subjected to a chemical visbreaking process carried out in the presence of the appropriate visbreaking agents, such as peroxides. Said chemical visbreaking process is carried out using well known methods.

The 1-butene polymers adequate for the use in this invention are both the homopolymers or copolymers of 1-butene with an olefin comonomer selected, preferably, from ethylene and propylene. As a way of example, the quantity of comonomer in the copolymers ranges from 0.5 to 30% by weight, preferably from 1 to 20% by weight. The homopolymers are preferred.

Said poly(1-butene) is a crystalline or semicrystalline isotactic polymer with an isotactic index of at least 60%, preferably 90%; in the case of poly(1-butene) homopolymers the isotactic index is preferably at least 95%. Said isotactic index is expressed as a percentage of mmmm pentads, and is determined by analysis of spectra $^{13}$C-NMR (see note 2).

Preferably, the poly(1-butene) used to prepare the mixtures of the present invention has an intrinsic viscosity (η) ranging from 1 to 4 dl/g, preferably from 1.3 to 3 dl/g.

Said 1-butene polymers can be obtained using known methods, processes, and polymerization catalysts; for example, the polymerization of the 1-butene, optionally in the presence of an olefin comonomer such as ethylene or propylene, can be carried out using Ziegler-Natta or metallocenic catalysts.

As a way of example, in order to produce the 1-butene polymers described above one can use $TiCl_3$ based catalysts, and aluminum derivatives, such as aluminum halides for example, as cocatalysts, as well as the catalytic systems described in allowed U.S. application Ser. No. 08/469,735 and U.S. Pat. No. 4,971,937, and those mentioned above for the production of heterophasic composition (II), or catalytic systems with metallocenic catalysts, such as the ones described in U.S. Pat. No. 4,769,510.

The mixtures of this invention can also contain various additives generally used in thermoplastic polymer compositions, such as stabilizers, antioxidants, anti-corrosion agents, anti-UV agents, carbon black, pigments, plasticizing agents, etc. Other types of additives optionally present are flame retardants and fillers, such as mineral fillers, capable of conferring specific properties to the manufactured articles.

The mixtures of the present invention can be prepared by mixing the components in an apparatus equipped with mixing elements, such as an internal mixer or an extruder. For example, one can use a Banbury mixer, or a Buss single-screw extruder, or a Maris or Werner twin-screw extruder. The mixing is carried out at high temperatures, generally greater that 180° C., preferably ranging from 180° to 240° C.

The chemical visbreaking of heterophasic composition (II) using the proper agents can be carried out in the presence of poly(1-butene), i.e., in the presence of component (I), and optionally other additives, as well as before the addition of component (I). Preferably the visbreaking of heterophasic composition (II) occurs in the presence of poly(1-butene). The visbreaking process is carried out according to known methods, and using visbreaking agents known in the art. Generally speaking, said agents are organic free-radicals initiators, particularly organic peroxides. Specific examples of the latter are di(tert-butyl)peroxide isopropyl benzene, dicumyl peroxide, monocumyl (tert-butyl)peroxide, and 2,5-bis(tert-butyl peroxide)-2,5- dimethylhexane.

As an alternative, the production of the mixtures of this invention can be carried out by sequential polymerization of said fractions (I) and (II) in three or more stages, in the presence of the above mentioned catalysts, and according to known methods and processes, such as the ones described in above mentioned European patent application EP-A-472046. The sequential polymerization can be carried out, for example, as described above for the production of heterophasic composition (II). Preferably, the poly(1-butene) is produced in gas phase. In said stage an inert gas, preferably nitrogen, is used as the diluent of the gas monomer. The sequence of the polymerization stages in the various fractions for the production of the mixture of the present invention is not binding. However, it is preferable to first conduct the polymerization process to produce fraction (A) of heterophasic composition (II), then produce the poly(1-butene), and finally fractions (B) and (C) of heterophasic composition (II).

The MIL values of the mixtures of this invention have a wide range, such as for example from 0.1 to 100 g/10 min, more preferably from 0.2 to 50 g/10 min.

The mixtures of the present invention are generally obtained in the form of pellets. The latter are then transformed and shaped into articles by way of known processes, such as injection and coinjection molding, sequential injection molding, and blow molding, or are transformed into laminates by way of extrusion, where the term [laminates] comprises film and sheets. The following examples are given in order to illustrate, but not limit the present invention. The methods used to obtain the data relative to the properties reported in the examples and the description (unless otherwise specified) are listed below.

| Properties | Methods |
| --- | --- |
| Melt Index L (MIL) | ASTM D-1238, condition L |
| Melt Index E (MIE) | ASTM D-1238, condition E |
| Fraction soluble in xylene | (see note 1 below) |
| Intrinsic viscosity | Determined in tetrahydronaphtalene at 135° C. |
| Isotactic index | Spectroscopy of $^{13}$C-NMR (see note 2 below) |
| Gloss | ASTM D 2547 |
| Haze | ASTM D-1003 |
| Flexural modulus (FM) | ASTM D-790 |
| Stress at yeld | ASTM D-638 |
| Elongation at yield | ASTM D-638 |
| Tensile strength | ASTM D-638 |
| Elongation at break | ASTM D-638 |
| Hardness (Shore D) | ASTM D-2240 |

Note 1

Determination of percentage soluble in xylene: a solution of the sample in xylene is prepared at a concentration of 1% by weight, maintaining the sample in xylene under agitation for 1 hour at 135° C. Continuing to stir, the solution is allowed to cool to 95° C., after which it is poured in a 25° C. bath, where it is allowed to rest for 20 minutes without agitation, and then the stirring resumes for an additional 10 minutes. The solution is filtered, and acetone is added to a portion of the filtrate in order to precipitate the dissolved polymer. The polymer obtained in this manner is recovered, washed, dried, and finally weighed to determine the percentage soluble in xylene.

Note 2

The analysis was carried out with a Bruker Avance DPX 400 instrument at 400.12 MHz, using the 1,1,2,2-tetrachloroethane dideuterate as a solvent at a temperature of 120° C. The percentage of isotactic pentades was calculated using the following formula (Immmm+Immmr+Immrr)100/total where Immmm, Immmr, Immrr are the integrals of the peaks at 27.78 ppm, 27.62 ppm, and 27.42 ppm respectively; said integrals are calculated with respect to the total of the averages of the integrals of the signals at 40.28 ppm (signal of the CH$_2$ chain), and at 35.05 ppm (signal of the CH).

COMPONENTS USED IN THE EXAMPLES AND COMPARATIVE EXAMPLES

1) Isotactic homopolymer of 1-butene having an isotactic index of 96%, intrinsic viscosity [η] of 2.3 dl/g, and MIE of 0.4 g/10 min.
2) Heterophasic composition (II), having MIL values ranging from 0.6 to 1 g/10 min, comprising (weight percentage):
   A. 35% of a crystalline propylene random copolymer, and 3.5% of ethylene; the copolymer contains about 6.5% of a fraction soluble in xylene at 25° C., and has an [η] of 1.5 dl/g;
   B. 5% of an essentially linear ethylene/propylene copolymer totally insoluble in xylene at 25° C.; and
   C. 60% of an amorphous elastomeric ethylene/propylene copolymer, containing 27.1% of ethylene, totally soluble in xylene at 25° C., and having an [η] of 3.2 dl/g.

The composition is obtained by way of sequential polymerization in the presence of a high yield and highly stereospecific Ziegler-Natta catalyst supported on MgCl$_2$.

3) Isotactic copolymer of 1-butene with 5% by weight of ethylene, having an isotactic index of 95%, intrinsic viscosity of 1.45 dl/g, and MIE of 3 g/10 min.
4) 2,5-bis(tert-butyl peroxide)-2,5-dimethylhexane marketed by Akzo Nobel under the trademark of Luperox 101.

Example 1

The isotactic homopolymer of 1-butene (component (1)) and the heterophasic composition (component (2)) are mixed together at a ratio of 5:95 parts by weight in a Bestort extruder (25 mm) operating under the following conditions: a melt temperature of 220° C., and a mixing rate of 250 rpm. During mixing the mixture undergoes chemical visbreaking caused by the 2,5-bis(tert-butyl peroxide)2,5-dimethylhexane.

1.5 mm thick specimens were subsequently obtained from the mixture thus produced by way of injection molding using a "Negri-Bossi NB90" press.

Table 1 shows some of the properties of said specimens. FIG. 1 shows the stress/strain curve.

Example 2

Example 1 was repeated with the only difference being that the weight ratio of component (1) and component (2) is 20:80.

Figure 2:
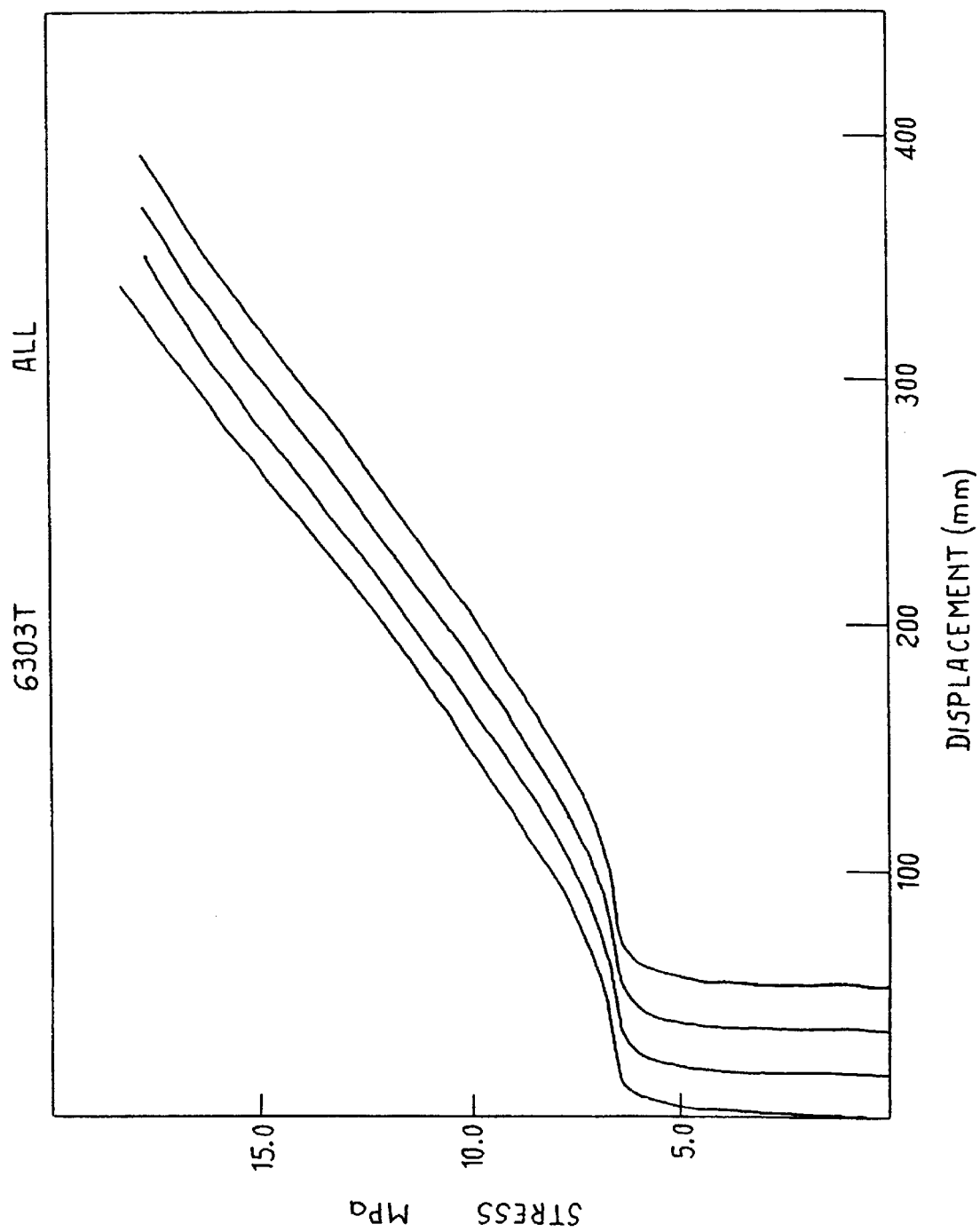
FIG. 2 depicts a stress/strain curve of specimens produced according to Example 2.

Table 1 shows some of the properties of the specimens produced in this manner. FIG. 2 shows the stress/strain curve.

Example 3

Example 1 was repeated with the only differences being that the 1-butene copolymer (component (3)) was used instead of component (1), and the component (2) and component (3) weight ratio was 90:10.

Figure 3:
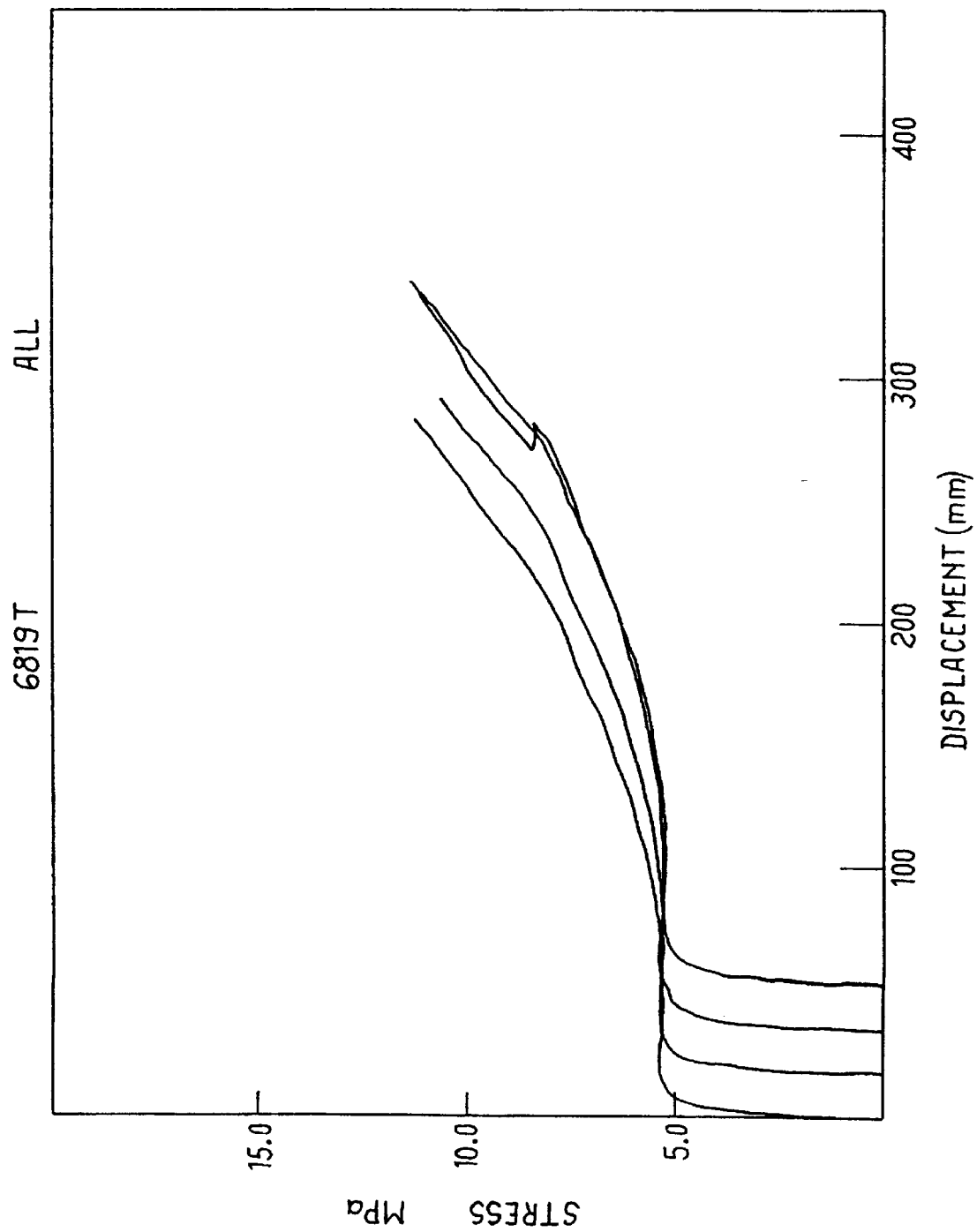
FIG. 3 depicts a stress/strain curve of specimens produced according to Example 3.

Table 1 shows some of the properties of the specimens produced in this manner. FIG. 3 shows the stress/strain curve.

Example 4

Example 3 was repeated with the only difference being that the weight ratio of component (2) and component (3) was 80:20.

Figure 4:
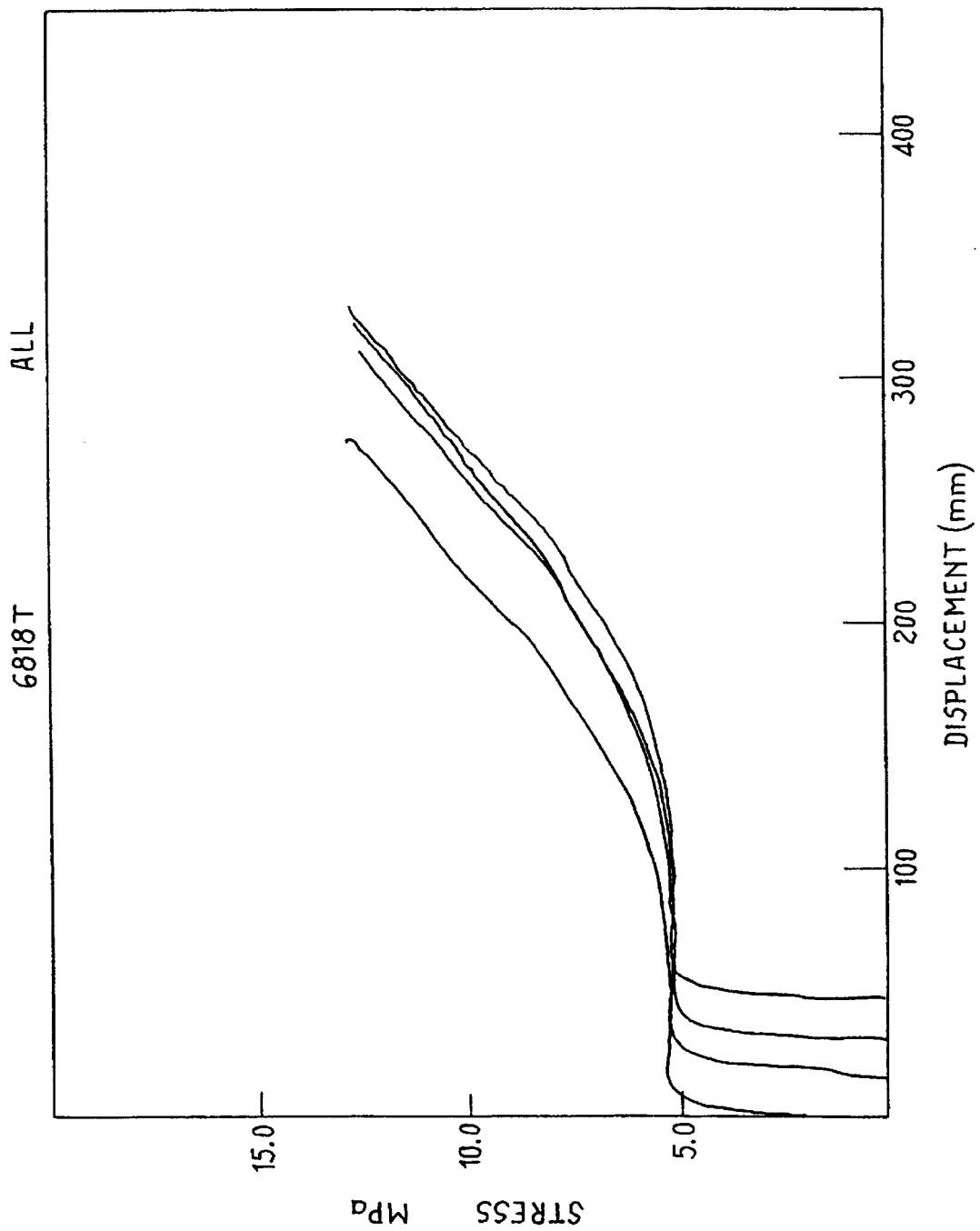
FIG. 4 depicts a stress/strain curve of specimens produced according to Example 4.

Table 1 shows some of the properties of the specimens produced in this manner. FIG. 4 shows the stress/strain curve.

Comparative Example 1c

Example 3 was repeated with the only difference being that only component (2) was used instead of the above mentioned components mixture.

Figure 5:
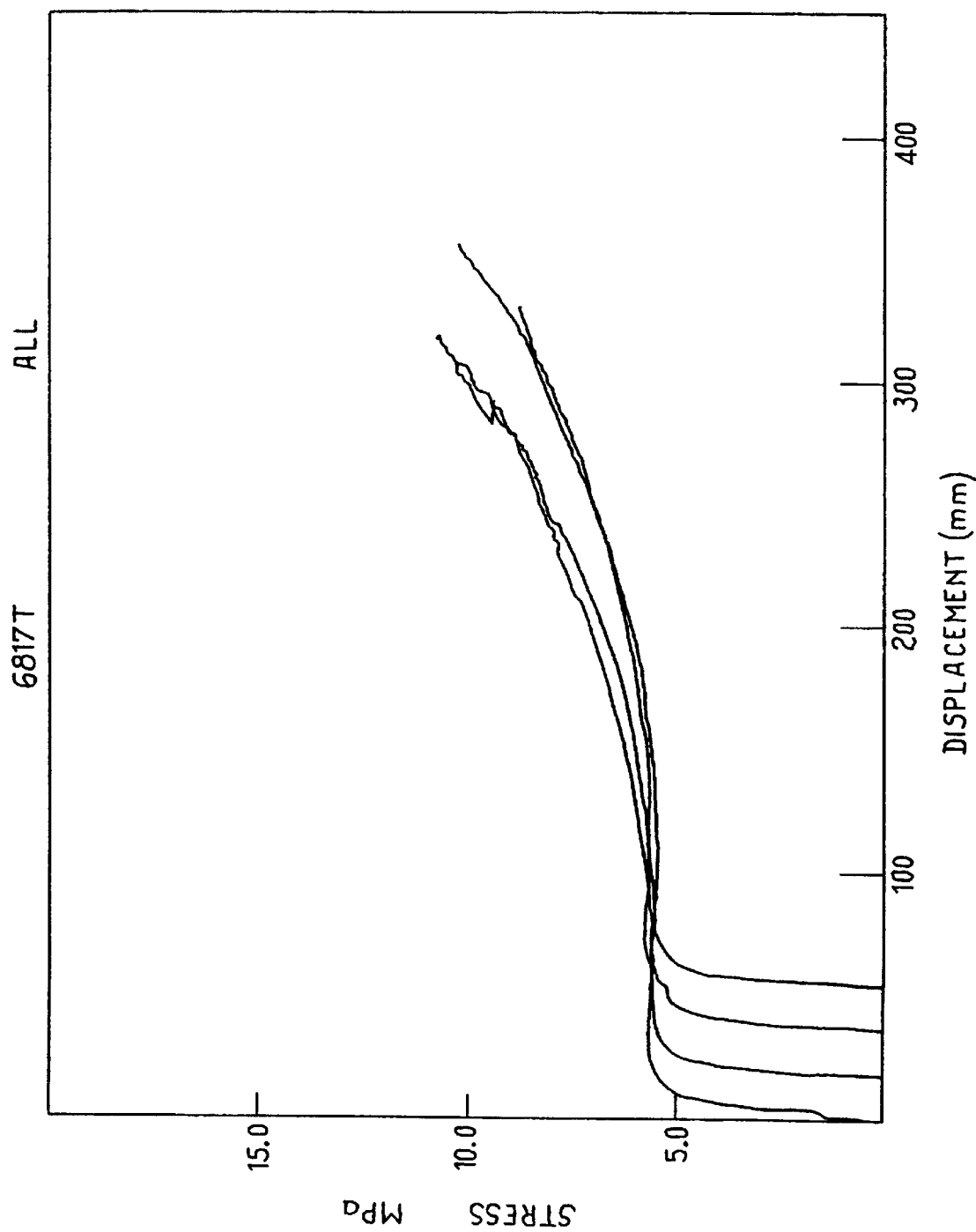
FIG. 5 depicts a stress/strair, curve of specimens produced according to Comparative Example 1c.

Table 1 shows some of the properties of the specimens produced in this manner. FIG. 5 shows the stress/strain curve.

Comparative Example 2c

Comparative example 1 was repeated using a heterophasic composition with a solubility in xylene of 54% by weight, having the following composition:

A. 45% by weight of a crystalline propylene random copolymer, and 3.5% by weight of ethylene, 6.5% by weight soluble in xylene;

B. 4% by weight of an essentially linear ethylene/propylene copolymer totally insoluble in xylene at 25° C.; and C. 54% by weight of an amorphous elastomeric ethylene/propylene copolymer, containing 26.4% of ethylene, totally soluble in xylene at 25° C.

The visbreaking of the composition is carried out until a MIL of 8 dg/min is obtained. The specimens produced from the above mentioned composition show a MEF value of 230 MPa, and gloss value of 26.3.

Comparative Example 3c

Comparative example 2c was repeated, with the only difference being the use of a heterophasic composition (II), 53% by weight soluble in xylene, with the following composition:

A. 45% by weight of a propylene crystalline random copolymer with 2% by weight of ethylene, 4% by weight soluble in xylene;

B. 4% by weight of an essentially linear ethylene-propylene copolymer totally insoluble in xylene at 25° C.; and C. 51% of an ethylene/propylene amorphous copolymer containing 26.3% of ethylene, totally soluble in xylene at 25° C.

The visbreaking of the composition is carried out until a MIL of 8 dg/min is obtained. The specimens produced from the above mentioned composition show a MEF value of 220 MPa, and gloss value of 31.7.

The data of the examples show that the gloss of the mixtures of the present invention is clearly superior to that of the mixtures of the comparative examples. The gloss phenomenon, as well as the tackiness one, are connected with the surfacing of the low molecular weight polymer fraction: the more said surfacing is reduced, the greater the gloss, and at the same time the tackiness of the product surface diminishes.

Moreover, the data in Table 1 show that compared to the composition of comparative example 1c, the mixtures of the present invention have increased tenacity since the tensile strength values are higher; at the same time, compared to other mechanical properties the mixture of the present invention shows a behavior very similar to that of the composition used for comparison. In particular, the curves of FIGS. 1–5 subtend an area corresponding to the energy necessary for an elongation of the specimen equal to 800% ca. The tests were carried out according to method ASTM D 638. From the above mentioned curves one can clearly deduce that the energy required to cause said elongation is greater for the curves of FIGS. 1–4 compared to the curve of FIG. 5, i.e., the specimens associated with the curves of FIGS. 1–4 require a greater strength in order to deform compared to the strength that is used with the specimen associated with the curve of FIG. 5.

TABLE 1

| | Example | | | | |
|---|---|---|---|---|---|
| | 1 | 2 | 3 | 4 | 1c |
| MIL (g/10 min) | 11.6 | 11.2 | 12.6 | 11.5 | 11.7 |
| Gloss[1] | 21 | 72 | 29.5 | 46.5 | 14 |
| MEF (MPa) | 105 | 150 | 100 | 100 | 95 |
| Tensile strength (MPa) | >13.4 | >17.8 | >13.1 | >15.3 | >10 |
| Stress at yield (MPa) | 5.5 | 6.3 | 5.2 | 5.2 | 5.6 |
| Elongation at break (%) | >760 | >680 | >700 | >700 | >760 |
| Elongation at yield (%) | 37 | 38 | 39 | 33 | 48 |
| Haze (%) | 32 | >31 | 34 | 41 | 31 |
| Hardness (Shore D) (points) | 32 | 31 | 31 | 33 | 29 |

[1]Measurements carried out at 60° C. after 4 days of aging in a 60° C. oven.

What is claimed is:

1. Thermoplastic and elastomeric polyolefin mixture comprising the following fractions (weight percentages):

I. from 3 to 25% of crystalline or partially crystalline isotactic poly(1-butene); and II. from 75 to 97% of a heterophasic polyolefin composition comprising the following fractions:

A. 4–40% of a crystalline propylene homopolymer, or a crystalline copolymer of propylene with ethylene or a $CH_2=CHR$ α-olefin, where R is a $C_2$–$C_8$ alkyl radical, or a crystalline copolymer of propylene with ethylene and said $CH_2=CHR$ α-olefin, said copolymers containing over 85% of propylene, and having a fraction insoluble in xylene greater than 80%;

B. 0–20% of a crystalline copolymer of ethylene with propylene or a $CH_2=CHR$ α-olefin, where R is a $C_2$–$C_8$ alkyl radical, or a crystalline copolymer of ethylene with propylene and said α-olefin, said copolymers being insoluble in xylene at ambient temperature; and C. 40–96% of an elastomeric copolymer of ethylene with propylene or a $CH_2=CHR$ α-olefin, where R is a $C_2$–$C_8$ alkyl radical, and optionally minor quantities of a diene, or a copolymer of ethylene with propylene and said α-olefin, and optionally minor quantities of a diene, said copolymers containing ethylene in a quantity lower than 40%, and being soluble in xylene at ambient temperature.

2. Mixture of claim 1, where the poly(1-butene) is a homopolymer or copolymer of 1-butene with an olefinic comonomer selected from ethylene and propylene, the quantity of said comonomer ranging from 0.5 to 30% by weight.

3. Mixture of claim 1, where the heterophasic composition II is produced by way of sequential polymerization in at least two stages, in the presence of a highly stereospecific Zigler-Natta catalyst.

4. Mixture of claim 1, where the mixture is produced by way of sequential polymerization in at least three stages, in the present of a highly stereospecific Zigler-Natta catalyst.

5. Articles manufactured with the mixture of any one of claims 1, 2 or 3.

* * * * *